United States Patent [19]

Swanson et al.

[11] Patent Number: 5,572,267
[45] Date of Patent: Nov. 5, 1996

[54] PASSIVE DATA RECORDING ONTO MAGNETIC LAYERS OF PHOTOGRAPHIC FILM

[75] Inventors: Robert E. Swanson, Del Mar; Tomasz Jagielinski, Carlsbad; George W. Brock, La Jolla, all of Calif.

[73] Assignee: Eastman Kodak Company, Rochester, N.Y.

[21] Appl. No.: 294,285

[22] Filed: Aug. 23, 1994

[51] Int. Cl.⁶ .................................................. G03B 29/00
[52] U.S. Cl. ........................................... 396/319; 396/429
[58] Field of Search ................. 354/75, 76, 105, 354/106

[56] References Cited

U.S. PATENT DOCUMENTS

| | | | |
|---|---|---|---|
| 2,734,948 | 2/1956 | Mueller | 179/100.2 |
| 2,943,148 | 6/1960 | Hell | 178/17 |
| 3,409,853 | 11/1968 | Guerth | 335/284 |
| 3,693,182 | 9/1972 | Smith | 346/74 M |
| 3,699,269 | 10/1972 | Smaller | 179/100.2 E |
| 3,803,634 | 4/1974 | Namikawa | 346/74 MP |
| 3,995,313 | 11/1976 | Fayling | 360/15 |
| 4,358,805 | 11/1982 | Stemme et al. | 360/106 |
| 4,490,027 | 12/1984 | Frank et al. | 354/21 |
| 4,678,299 | 7/1987 | Harvey | 354/21 |
| 4,888,604 | 12/1989 | Tosaka et al. | 354/21 |
| 5,343,264 | 8/1994 | Itoh et al. | 354/106 |
| 5,450,149 | 9/1995 | Cocca | 354/106 |
| 5,453,805 | 9/1995 | Itoh | 354/106 |

Primary Examiner—Howard B. Blankenship
Assistant Examiner—Matthew Miller
Attorney, Agent, or Firm—William F. Noval

[57] ABSTRACT

A magnetic recorder includes multiple permanent magnetic elements having magnetic orientations that impart a sequence of magnetic transitions to magnetic media of a photographic filmstrip contained within a camera. The permanent magnetic elements are external to the camera. The sequence of magnetic transitions comprise information that can be subsequently retrieved and provided to the photographic processor and/or photographer. The information can include identification of locale or other information of interest to the photographer. The magnetic recorder requires no power supply and is easily operated by a photographer virtually without regard to weather conditions.

23 Claims, 4 Drawing Sheets

PASSIVE DATA RECORDING ONTO MAGNETIC LAYERS OF PHOTOGRAPHIC FILM

BACKGROUND OF THE INVENTION

1. Field of the Invention

This invention relates generally to recording of data onto photographic film and, more particularly, to recording of data onto photographic film having a magnetics-on-film layer.

2. Description of the Related Art

Data recording cameras are known in which information such as exposure date, time of day, frame number, and the like can be optically recorded into photographic film as images are exposed in the camera so that the information is readable thereafter. The information is optically recorded by means of light producing elements in the camera, such as light emitting diodes, that expose a portion of the photographic film when a frame is exposed. While the information is useful, the information also detracts aesthetically from the produced image and the nature and amount of the information recorded is somewhat limited.

It also is known to provide photographic film with a layer of magnetic media onto which data can be recorded. The data is recorded and read using magnetic heads. Thus, the information noted above can be recorded and, in addition, information such as exposure settings, camera identification, detailed photographer identification data, and the like can be recorded. Recording information such as exposure settings is advantageous because photographic processing can be enhanced by reading the encoded data and, depending on the nature of the data, the encoded information can be retrieved and made available to the photographer when the processed film is returned, without marking or otherwise writing or obscuring a portion of the photographic image. Alternatively, some or all of the information can be selected for inclusion within the photographic image.

The recording of information onto the MOF layer by the camera represents a great convenience, but requires a specially-designed and equipped camera having magnetic recording heads. The camera therefore requires a power supply for the heads as well as recording control circuitry that can generate the signals necessary for encoding information. An inadequate power supply renders the recording heads useless. In addition, information related to the specific image being reproduced in the camera, such as the location of the photographic scene, is not readily entered and recorded. Even if a user could enter derailed image data for recording, entering the data likely would be a tedious and potentially time-consuming task that could interfere with the picture-taking process. The mechanism for entering picture data, such as a keypad, would add to camera bulk and complexity. Thus, it would be advantageous to record identifying information concerning the photographic scene, such as the locale, points of interest, and so forth without requiring a photographer to provide the information and enter it into the camera.

From the discussion above, it should be apparent that there is a need for a system that permits information to be recorded into the MOF layer of photographic film without requiting specially-equipped cameras and without requiring entry of information by the photographer. The present invention satisfies this need.

SUMMARY OF THE INVENTION

In accordance with the invention, a fixed pattern of information is magnetically recorded onto a magnetic media layer of photographic film contained within a camera by an unpowered recording mechanism external to the camera that includes multiple permanent magnet elements having magnetic poles arranged in an array such that the poles provide a sequence of alternating magnetic orientations corresponding to the information pattern and also includes a housing that directs the camera to a position so the magnet elements impart the sequence of magnetic orientations to the magnetic media layer. The sequence of orientations constitutes information that can be subsequently retrieved and provided to a photographic processor and/or photographer. The magnetic recorder requires no power supply and is easily operated by a photographer virtually without regard to weather conditions. To use the recorder, a photographer simply moves a camera having a filmstrip with magnetic media into the housing. In this way, identification of locale or other information of interest can be readily imparted to the magnetic media layer of the photographic film without requiring a camera with special recording heads and without requiring a power source to generate the magnetically-recorded information.

In one aspect of the invention, a magnetic recorder for use with a camera having photographic film with a magnetic media layer includes a linear array of small permanent magnets oriented with alternating poles in a support housing such that the camera is placed in proximity to the array of magnets when the camera is received into the housing and the magnets record a sequence of magnetic transitions onto the magnetic media layer. The magnetic transitions recorded onto the film comprise a data sequence that can be read by a magnetic head to produce desired information. The magnetic recorder can advantageously be located at points of interest and can include magnets whose pole orientations record information concerning such points of interest.

In another aspect of the invention, the magnetic recorder comprises a roller wheel having a plurality of small permanent magnets oriented with alternating poles disposed along the outer circumference of the wheel. The magnets record a sequence of magnetic transitions onto the magnetic media layer as the wheel is rolled adjacent the back of the camera. The magnetic transitions recorded onto the film comprise a data sequence that can be read by a magnetic head to produce desired information. The roller wheel can be located at least partially within a housing that receives the camera such that frictional engagement occurs between the permanent magnets and the camera.

Other features and advantages of the present invention should be apparent from the following description of the preferred embodiments, which illustrate, by way of example, the principles of the invention.

DESCRIPTION OF THE PREFERRED EMBODIMENTS

Figure 1:
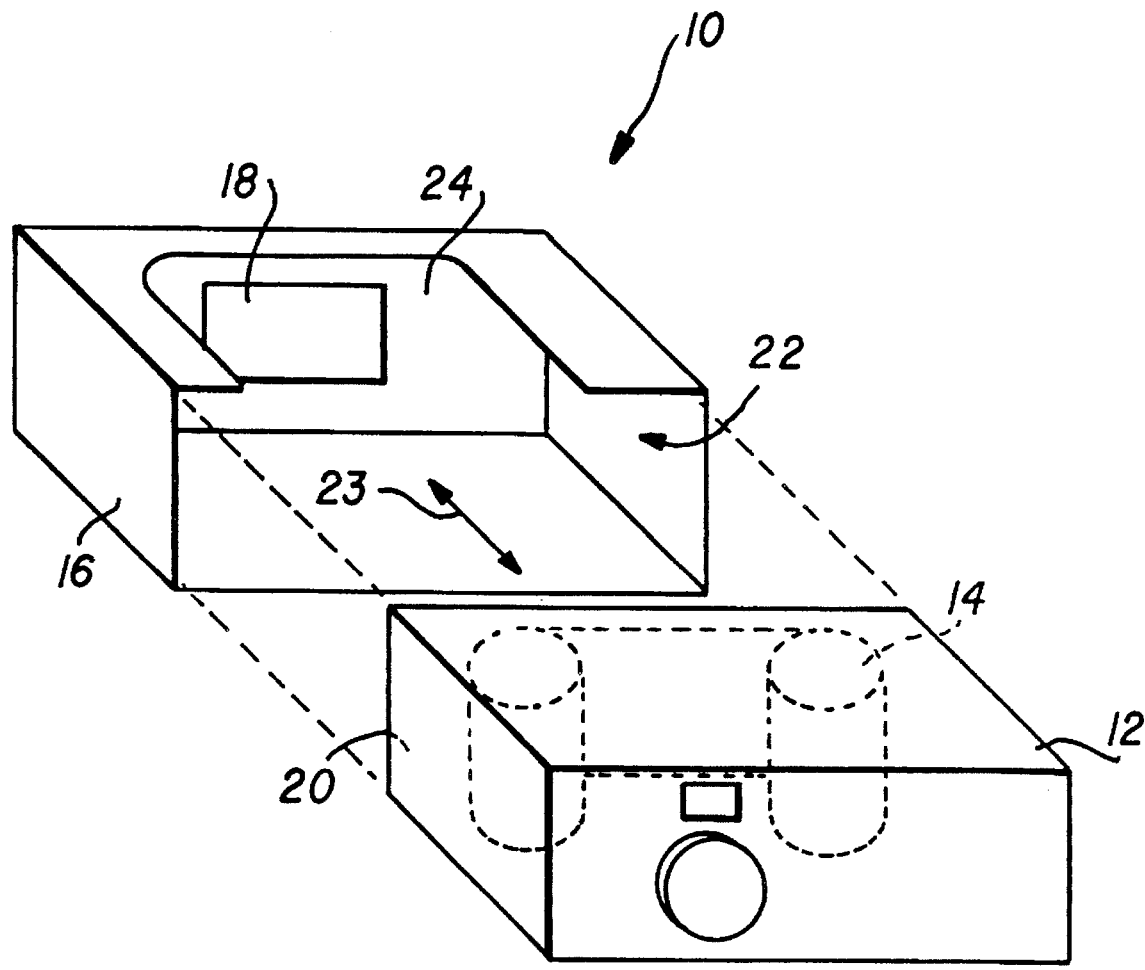
FIG. 1 is a perspective view of a magnetic recorder constructed in accordance with the present invention.

FIG. 1 shows a magnetic recorder 10 constructed in accordance with the present invention receiving a single-use camera 12 having a photographic filmstrip 14 that is provided with a magnetic media layer. The recorder includes a housing 16 in which is disposed a linear array 18 of small permanent magnets. When the camera is positioned with the camera back 20 adjacent the array, the film in the camera is sufficiently close to the array such that the magnets record a sequence of magnetic transitions onto the magnetic media layer. The dimensions of the magnets are selected so that the density of the magnetic transitions is sufficient to comprise data that can be read by a magnetic head. In this way, the data can provide information relating to, for example, the locale at which the recorder 10 is placed, such as points of interest or historical facts. After the data is read from the magnetic media layer, the data can be decoded into text and placed, for example, on the back side of a photographic print or in the margin of a transparency mount.

To use the recorder 10, a photographer simply places the camera 12 into a receiving slot 22, or opening, of the recorder housing 16 so that the camera back 20 is directed to a location adjacent the linear array 18. Movement of the camera 12 relative to the linear array occurs along the direction of the arrow 23. After the camera back is moved to the linear array, the camera is withdrawn from the housing. The information has been recorded onto the magnetic media layer. Thus, the housing acts as a support for the permanent magnets and guides the camera into proper contact with the magnets to impart the pattern onto the magnetic media layer.

Preferably, the receiving slot 22 of the recorder 10 is adapted to receive a conventional single-use camera. Such cameras are popularly purchased by tourists or for tour purposes and therefore the recorder is adapted to the dimensions of typical single-use cameras. The receiving slot is oriented to ensure that the single-use camera 12 cannot be inserted vertically and to encourage a photographer to insert the camera with the proper orientation to record the information. Thus, the receiving slot of the recorder has a height approximately equal to the exterior height of the single use camera. The recorder preferably has a depth less than the depth of a single-use camera, so that a portion of the camera extends from the recorder after insertion into the receiving slot, thereby making withdrawal of the camera easier. An optional cut-away 24 in the top of the recorder housing also makes it easier for a photographer to withdraw the camera from the recorder.

The recorder 10 is advantageously located at tourist points of interest and the information recorded onto the magnetic media layer of the film relates to the picture location. It is anticipated that the recorded information will be read back later during photofinishing and that the information will comprise a location identifier. More particularly, the location identifier can be used to retrieve a more complete description of the locale from a data bank. The data bank can be easily updated with software modifications. Moreover, the more complete description can comprise sound recordings that might be added to the "Photo CD" format, or can comprise printed information provided to supplement the photographic image. Additional formats for providing more complete descriptions will occur to those skilled in the art.

Figure 2:
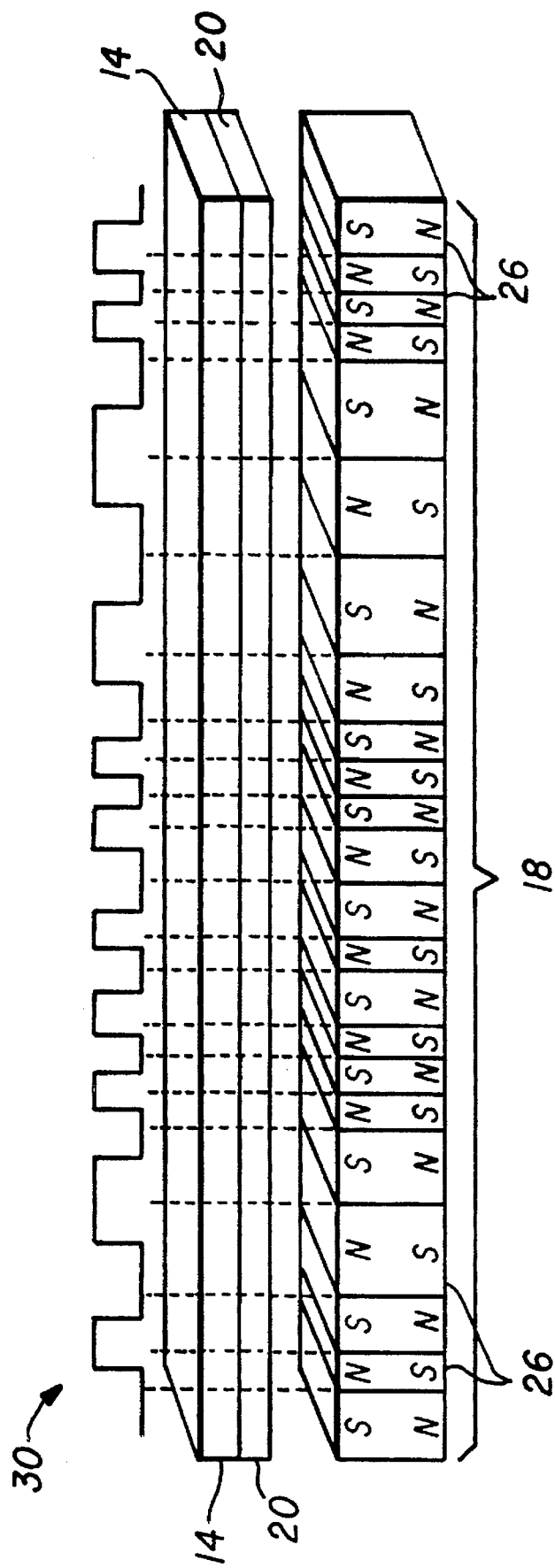
FIG. 2 is a detail view of the linear array recorder mechanism of the recorder illustrated in FIG. 1.

FIG. 2 illustrates further details of the recorder 10 and shows that the linear array 18 comprises a plurality of small permanent magnets 26 that have magnetic poles indicated as "N" and "S" and that are arranged with alternating pole orientations. The magnets are shown in the approximate operational relationship relative to the filmstrip 14 and its magnetic media layer, which preferably comprises a magnetics-on-film (MOF) layer and the camera back 20, for purposes of illustration. As shown in FIG. 2, the permanent magnets 26 have a variety of widths to encode a variety of data patterns.

The code pattern 30 illustrated in FIG. 2 is a representation intended to show the pattern sequence of magnetic transitions recorded onto the MOF layer of the film. FIG. 2 shows that the code pattern corresponding to the non-uniform magnet widths represents an information signal, such as digital data. The precise amount of data represented by the magnetic transitions depends on the widths of the magnets and the space available on the filmstrip within one photographic image. Thus, if the MOF layer is optically transparent and extends across the entire area of the filmstrip, multiple rows of arrays could be provided to record a relatively great deal of information.

The permanent magnets 26 are selected so as to record transitions on magnetic media having less coercivity than the field set up around the magnets. Thus, in the "contact" recording provided by the linear array recorder illustrated in FIGS. 1 and 2, a target magnetic media (such as the MOF layer of film) is placed firmly against a linear array of magnets having a coercivity of, for example, 5000 Oersteds (Oe) and is then removed from contact. Magnetized regions, or magnetic transitions, are recorded into the target material in an image of the magnet orientations of the linear array.

Figure 3:
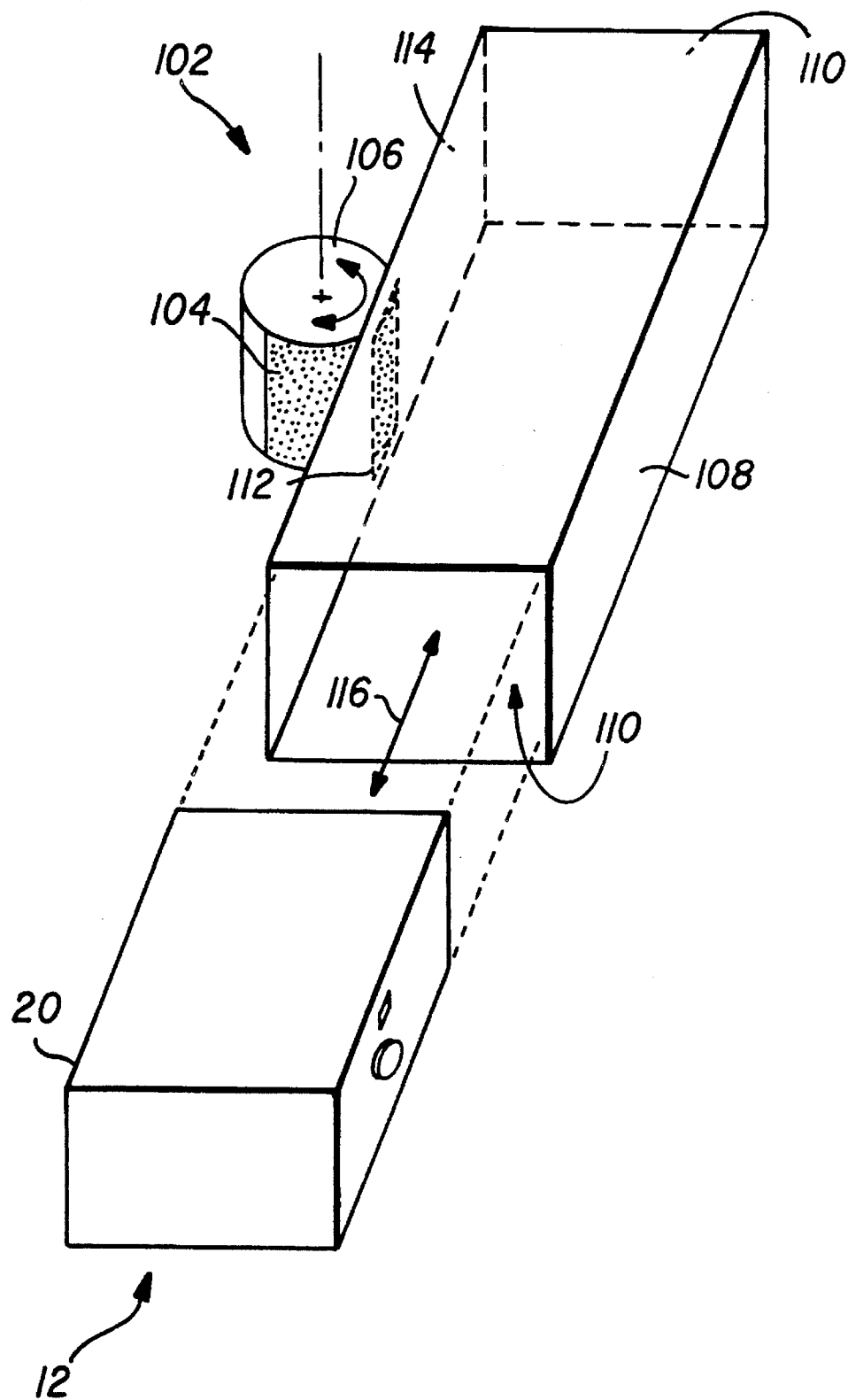
FIG. 3 is a perspective view of a magnetic recorder having a roller recorder mechanism constructed in accordance with the present invention.

In an alternative embodiment illustrated in FIG. 3, a recorder 102 includes permanent magnets 104 that are disposed with their alternating poles disposed along the outer circumference of a rotatable roller wheel 106. The recorder is shown in phantom for purposes of illustration. As with the linear array described above, the magnets record a sequence of magnetic transitions onto a target magnetic media. More particularly, as a target media (or camera containing the target media) is rolled relative to the roller wheel recorder, the magnets in mm are placed in relatively close proximity to the target media and record magnetic transitions into the media for later reading.

In FIG. 3, the single-use camera 12 from above having a photographic filmstrip with an MOF layer is shown with the recorder particularly adapted for a "photo locale" recording function. The recorder 102 includes a housing 108 that receives the camera and directs the camera so that the camera back 20 is positioned adjacent the permanent magnets 104 and the appropriate patterns are magnetized onto the MOF layer of the camera film 14 (FIG. 1). The housing comprises a hollow box or guide tube having open ends 110 that are sized to receive a typical single-use camera in the proper orientation for recording onto the MOF layer.

The roller wheel 106 of the recorder is supported such that a portion of the outer circumference extends into an opening 112 of a side 114 of the housing 108. As the single-use camera 12 is pushed through the housing, it passes by the roller wheel and comes into frictional contact with the permanent magnets 104 of the wheel so that the wheel rolls along with the passing camera. In this way, the magnets are rotated into proximity with the filmstrip 14 of the camera so that the magnets cause the MOF layer 28 of the film 14 adjacent the camera back 20 to become magnetized in the pattern of the magnets. Movement of the camera 12 relative to the roller wheel 106 occurs along the direction of the arrow 116.

Thus, pressure between the roller wheel surface and the passing media-containing camera must be sufficient to rotate the wheel without slippage so the magnetized transitions recorded in the magnetic media have clear boundaries. This permits the recorded pattern to be easily read. The rate at which the camera 12 is pushed through the housing 108 is relatively unimportant because the roller wheel 106 is mined by the frictional contact with the camera back 20. Thus, the permanent magnets will impart the corresponding fixed pattern of magnetic orientations virtually irrespective of the speed with which the camera is moved past the roller wheel.

Figure 4:
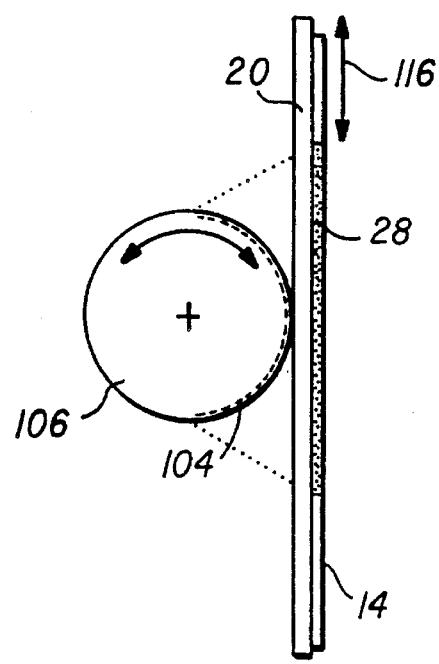
FIG. 4 is a side view of the roller recorder illustrated in FIG. 3.

FIG. 4 shows the roller wheel 106 in a plan view, relative to the back 20 of the exemplary single-use camera 12 (FIG. 1) and the filmstrip 14 with its MOF layer 28. FIG. 4 illustrates that the permanent magnets 104 need not be disposed completely around the roller wheel. If the wheel can make one complete revolution within the space of a single film frame, then the magnetized pattern is ensured of being recorded onto the MOF layer even if only one sequence of the permanent magnets is provided around the circumference of the wheel. Alternatively, the pattern can be repeated around the roller wheel, providing redundant patterns, if desired for error checking or other safeguard against slippage.

Figure 5:
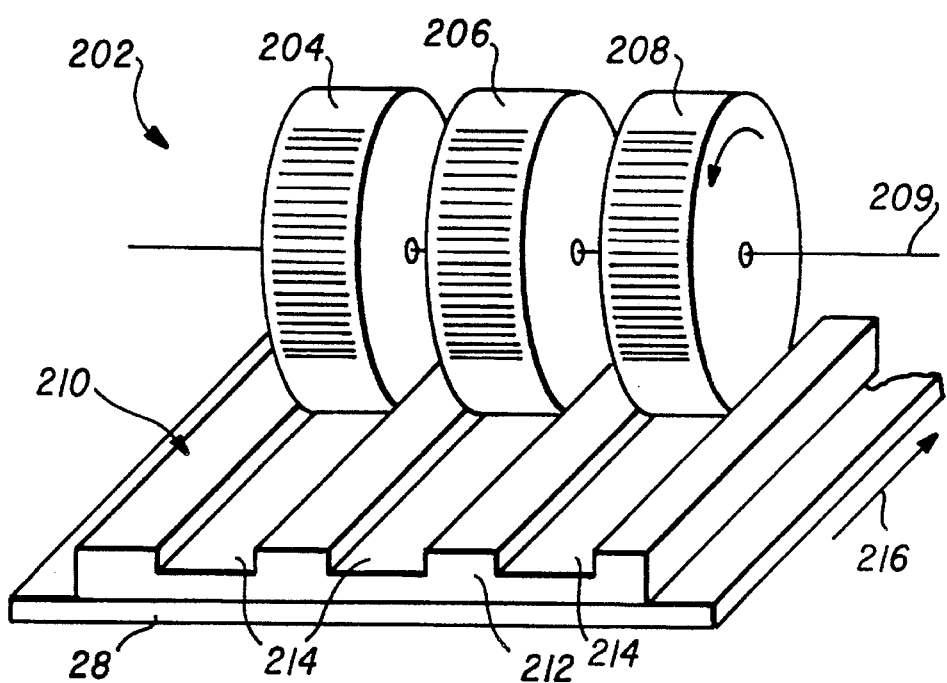
FIG. 5 is a perspective view of a multi-track roller recorder constructed in accordance with the present invention.

To increase the amount of data that can be recorded in a fixed length of magnetic media, such as a frame of a photographic filmstrip, multiple roller wheels may be provided. For maximum data recording, each wheel would be provided with a different pattern and corresponding set of permanent magnets. FIG. 5 shows a recorder 202 having a three-roller arrangement that therefore provides a three-track recording of magnetic transitions. Three rollers 204, 206, 208 rotate about a support rod 209 and therefore rotate on the same axis. In the illustrated embodiment, the camera 210 shown includes a camera back 212 having grooves 214 that each receive a different one of the roller wheels. Again, the MOF layer 28 of the photographic filmstrip is shown adjacent the camera back 212. The grooves can provide increased precision of recording by maintaining a precise relative spacing and permitting relatively tight frictional contact between the camera back and the three roller wheels. Movement of the camera relative to the roller wheels occurs along the direction of the arrow 216.

It has been found that regular, repeating pole intervals having a spacing on the order of thirty-five mils can be easily produced using the teachings of this invention. Such a spacing interval provides approximately 28.5 bits/inch (11.22 bits/cm) of information. With a 35-mil pole spacing, an easily identifiable magnetized pattern has been read in magnetic media having a coercivity of approximately 900 Oe up to a separation distance of approximately one-tenth of the pattern wavelength (that is, up to a separation distance of 3.5 mils).

It also has been found that greater separation distances (even ninety mils separation) can be achieved with patterns having longer pattern spacing, or wavelengths, and lower coercivity magnetic media. Thus, if relatively large separation distances are dictated by camera or housing design, then longer pattern lengths and/or lower coercivity media are indicated. Given the magnetic field strength of the permanent magnets and the coercivity of the magnetic media employed, recorders constructed in accordance with the invention provide overwrite capability so that no read-back problems have been shown from multiple insertions of a fixed section of magnetic media into the recorders.

The magnetic recorders described above record a magnetic pattern into magnetic media, such as photographic film with an MOF layer, without special camera equipment such as magnetic write heads and without requiring a power source to generate the magnetic pattern. Thus, the recorders provided in accordance with the invention require no power supply and is easily operated by a photographer virtually without regard to weather conditions. In this way, identification of locale or other information of interest is readily imparted to the MOF layer of photographic film.

If desired, the magnetic recorders can include a drive mechanism that assists in moving the camera past the permanent magnets.

The present invention has been described above in terms of presently preferred embodiments so that an understanding of the present invention can be conveyed. There are, however, many configurations for passive recorders not specifically described herein but with which the present invention is applicable. For example, the permanent magnets can be mounted on the outer circumference of a roller wheel that is suspended from a handle, permitting a photographer to roll the wheel across the back surface of a camera to impart the magnetic pattern onto the magnetic media layer. The present invention should therefore not be seen as limited to the particular embodiment described herein, but rather, it should be understood that the present invention has wide applicability with respect to passive recorders generally. All modifications, variations, or equivalent arrangements that are within the scope of the attached claims should therefore be considered to be within the scope of the invention.

The following elements and their corresponding reference numerals are used in the drawings:

magnetic recorder 10
single-use camera 12
photographic filmstrip 14
recorder housing 16
linear array 18
camera back 20
receiving slot 22
direction arrow 23
housing cut-away 24
permanent magnets 26
MOF layer 28
code pattern 30
recorder 102
permanent magnets 104
roller wheel 106
housing 108
open ends 110
opening 112
housing side 114
direction arrow 116
recorder 202
rollers 204, 206, 208
support rod 209
camera 210
camera back 212
camera back grooves 214
direction arrow 216

We claim:
1. A method of magnetically recording a fixed pattern of information onto a magnetic media layer of a photographic filmstrip that is carried within a camera, comprising the steps of:

arranging a plurality of permanent magnets with magnetic poles in an array such that their poles provide a sequence of alternating magnetic orientations in the fixed pattern of information;

locating the permanent magnets relative to a housing adapted to receive the camera such that passing the camera into the housing places the filmstrip in sufficient proximity to the magnets that they impart the fixed pattern onto the magnetic media layer.

2. A method as defined in claim 1, wherein the step of arranging comprises placing the permanent magnets in a linear array.

3. A method as defined in claim 2, wherein the step of locating comprises placing the linear array so that the permanent magnets come into contact with a back surface of the camera when the camera is passed into the housing.

4. A method as defined in claim 1, wherein the step of arranging comprises placing the permanent magnets around the outer circumference of a roller wheel.

5. A method as defined in claim 4, wherein the step of locating comprises placing the roller wheel in an opening of the housing such that the roller wheel rotates and the permanent magnets come into frictional contact with a back surface of the camera when the camera is passed into the housing.

6. A method as defined in claim 4, wherein the step of locating comprises placing the roller wheel relative to the housing such that the roller wheel is rotated when the camera is passed into the housing and the permanent magnets impart the fixed pattern onto the magnetic media layer substantially irrespective of the speed with which the camera is passed within the housing and the fixed pattern is imparted onto the magnetic media layer.

7. A method as defined in claim 1, wherein the step of arranging comprises placing the permanent magnets such that the magnetic poles are spaced apart at a distance not more than approximately ten times the separation from the photographic filmstrip to the permanent magnets.

8. A method as defined in claim 1, wherein the step of locating comprises placing the permanent magnets such that the distance from the photographic filmstrip to the permanent magnets is not less than approximately one-tenth the minimum spacing interval of the magnetic poles.

9. A method of magnetically recording a fixed pattern of information onto a magnetic media layer of a photographic filmstrip that is carried within a camera, comprising the steps of:

arranging a plurality of permanent magnets in a sequence of alternating poles so as to provide a sequence of magnetic orientations in the fixed pattern of information;

moving the permanent magnets and camera relative to each other such that they make rolling contact with no interface sliding and the filmstrip in the camera is placed in sufficient proximity to the magnets that they impart the fixed pattern onto the magnetic media layer.

10. A method as defined in claim 9, wherein:

the step of arranging comprises placing the permanent magnets in a linear array; and the step of moving comprises moving the camera so that a back surface of the camera comes into contact with the linear array.

11. A method as defined in claim 9, wherein:

the step of arranging comprises placing the permanent magnets around the outer circumference of a roller wheel; and the step of moving comprises rolling the roller wheel on a back surface of the camera such that the permanent magnets come into frictional contact with the back surface and impart the fixed pattern onto the magnetic media layer.

12. A recorder for magnetically recording a fixed pattern of information onto a magnetic media layer of a photographic filmstrip that is carried within a camera, comprising:

a housing adapted to receive the camera;

a plurality of permanent magnets having magnetic poles that are arranged in an array such that the poles provide a sequence of alternating magnetic orientations in the fixed pattern of information and are located at least partially within the housing such that the permanent magnets are placed in sufficient proximity to at least one surface of the camera when the camera is received in the housing to impart the fixed pattern onto the magnetic media layer.

13. A recorder as defined in claim 12, wherein the permanent magnets are arranged in a linear array.

14. A recorder as defined in claim 13, wherein the permanent magnets are located within the housing such that they come into contact with a back surface of the camera when the camera is received in the housing and impart the fixed pattern onto the magnetic media layer.

15. A recorder as defined in claim 12, wherein the permanent magnets are arranged around the outer circumference of a roller wheel.

16. A recorder as defined in claim 15, wherein the roller wheel is supported relative to an opening of the housing such that the permanent magnets come into frictional contact with a back surface of the camera when the camera is received into the housing, thereby imparting rotation to the roller wheel and imparting the fixed pattern onto the magnetic media layer.

17. A recorder as defined in claim 16, further including multiple roller wheels each supported relative to the housing opening such that they each impart a corresponding fixed pattern of magnetic transitions onto the magnetic media layer.

18. A recorder as defined in claim 12, wherein the permanent magnets are arranged such that the magnetic poles are spaced apart at a distance not more than approximately ten times the separation from the photographic filmstrip to the permanent magnets when the camera is received into the housing and the fixed pattern is imparted onto the magnetic media layer.

19. A recorder as defined in claim 12, wherein the permanent magnets are located at least partially within the housing such that the distance from the photographic filmstrip to the permanent magnets is not less than approximately one-tenth the minimum spacing interval of the magnetic poles when the camera is received into the housing and the fixed pattern is imparted onto the magnetic media layer.

20. A recorder for magnetically recording a fixed pattern of information onto a magnetic media layer of a photographic filmstrip that is carried within a camera, comprising:

a plurality of permanent magnets with magnetic poles that are arranged in an array such that the poles provide a sequence of alternating magnetic orientations in the fixed pattern; and a support that locates the permanent magnets relative to the camera for relative rolling movement with no sliding motion between the camera and magnets such that the permanent magnets are placed in sufficient proximity to at least one surface of the camera to impart the fixed pattern onto the magnetic media layer of the filmstrip.

21. A recorder as defined in claim 20, wherein the permanent magnets are arranged in a linear array.

22. A recorder as defined in claim 20, wherein the support comprises a roller wheel around whose outer circumference the permanent magnets are arranged.

23. A recorder as defined in claim 22, wherein the support further comprises a housing having open ends adapted to receive the camera and having a side opening in which the roller wheel is supported such that the roller wheel rotates and the permanent magnets come into frictional contact with a back surface of the camera when the camera is received into the housing, thereby imparting the fixed pattern onto the magnetic media layer.

* * * * *